United States Patent
Gupta et al.

(10) Patent No.: US 12,375,379 B2
(45) Date of Patent: Jul. 29, 2025

(54) SYSTEMS AND METHODS FOR IDENTIFYING SPATIAL CLUSTERS OF USERS HAVING POOR EXPERIENCE IN A HETEROGENEOUS NETWORK

(71) Applicant: JIO PLATFORMS LIMITED, Ahmedabad (IN)

(72) Inventors: Ajay Kumar Gupta, Maharashtra (IN); Arun Nair, Maharashtra (IN); Aditya Ganesh, Maharashtra (IN); Aayush Bhatnagar, Maharashtra (IN); Avinash Bhardwaj, Rajasthan (IN)

(73) Assignee: JIO PLATFORMS LIMITED, Ahmedabad (IN)

(*) Notice: Subject to any disclaimer, the term of this patent is extended or adjusted under 35 U.S.C. 154(b) by 0 days.

(21) Appl. No.: 18/246,457

(22) PCT Filed: Mar. 28, 2022

(86) PCT No.: PCT/IB2022/052824
§ 371 (c)(1),
(2) Date: Mar. 23, 2023

(87) PCT Pub. No.: WO2022/208303
PCT Pub. Date: Oct. 6, 2022

(65) Prior Publication Data
US 2023/0370354 A1    Nov. 16, 2023

(30) Foreign Application Priority Data
Mar. 31, 2021   (IN) .............................. 202121015428

(51) Int. Cl.
*H04L 43/0888*   (2022.01)
*H04L 41/5067*   (2022.01)
*H04L 41/507*    (2022.01)

(52) U.S. Cl.
CPC ...... *H04L 43/0888* (2013.01); *H04L 41/5067* (2013.01); *H04L 41/507* (2013.01)

(58) Field of Classification Search
CPC ............. H04L 43/0888; H04L 41/5067; H04L 41/507; H04W 24/08; H04W 24/10
(Continued)

(56) References Cited

U.S. PATENT DOCUMENTS

| 10,003,605 B2 | 6/2018 | Muddu et al. |
| 2011/0235743 A1* | 9/2011 | Lee ...................... H04L 5/0053 375/295 |

(Continued)

FOREIGN PATENT DOCUMENTS

CN   104955077 A   9/2015

OTHER PUBLICATIONS

International Search Report from International Appl. No. PCT/IB2022/052824, mailed Jun. 27, 2022.

*Primary Examiner* — Karen C Tang
(74) *Attorney, Agent, or Firm* — FINNEGAN, HENDERSON, FARABOW, GARRETT & DUNNER, LLP

(57) ABSTRACT

The present disclosure provides novel solution for Network Optimization in telecommunications network that has traditionally always been driven by measuring and improving Key Performance Indicators (KPIs) of network elements vis-à-vis advancement for identification of the customers with poor experience and identification of spatial clusters of these customers to pinpoint the exact location of the problem, allowing for more targeted network optimization. The systems and methods contained in this invention enable the identification of these customers with poor experience and identifies spatial clusters of these customers to pinpoint the exact location of the problem, allowing for more targeted (Continued)

network optimization. This disclosure provides solution by aggregating a multitude of metrics pertinent to the user's voice, data and coverage experience and deriving a single KPI, it is possible to benchmark and correspondingly track and improve their experience.

20 Claims, 7 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2020/0413271 A1* | 12/2020 | Gupta | H04W 16/18 |
| 2021/0204152 A1* | 7/2021 | Vasudevan | G06N 20/00 |
| 2021/0360456 A1* | 11/2021 | Ratnam | H04B 17/318 |
| 2022/0167188 A1* | 5/2022 | Soulhi | G06N 10/60 |

* cited by examiner

SYSTEMS AND METHODS FOR IDENTIFYING SPATIAL CLUSTERS OF USERS HAVING POOR EXPERIENCE IN A HETEROGENEOUS NETWORK

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

TECHNICAL FIELD

The present disclosure relates to telecommunication and more particularly to identifying spatial clusters of users having poor experience in a heterogeneous network and is intended to be used for spatial clustering to identify clusters of users with sub-optimal experience in telecom network.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Today with the advent of wireless technology like GSM, EDGE, HSPA, LTE, and the like, all communications in a wireless network provide various communication services such as voice, video, data, advertisement, content, messaging, broadcasts, etc. One example of such a network is the Evolved Universal Terrestrial Radio Access (E-UTRA) which is a radio access network standard meant to be a replacement of the UMTS and HSDPA/HSUPA technologies specified in 3GPP releases 5 and beyond. E-UTRA is the air interface of 3GPP's Long Term Evolution (LTE) upgrade path for mobile networks. Unlike HSPA, LTE's E-UTRA is an entirely new air interface system, unrelated to and incompatible with W-CDMA. It provides higher data rates, lower latency and is optimized for packet data. The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High-Speed Packet Access (HSPA), which provides higher data transfer speeds and capacity to associated UMTS networks. With the capacity and higher data transfer speeds, there are many problems associated with the cells and the optimization of the cells.

In 5G cellular deployment, macro cells, along with various small cells, are planned to provide coverage and capacity solution across the target area. Thus, inter-site distance becomes narrower for the network. Further, a greater number of sites/eNodeBs are required to mitigate on-going data demand in the emerging network, which creates dense to hyper-dense radio access network in big cities.

Network Optimization in telecommunications network has traditionally always been driven by measuring and improving Key Performance Indicators (KPIs) of network elements in the heterogeneous network. This approach ignores the actual locations of the customers who were affected by the underperforming network element.

Currently, existing approaches of network optimization do not consider the actual issues faced by the customer, focusing only on improving the performance of the heterogeneous network element. The outcome of the network optimization activity does not always correspond to a direct improvement in the experience of the customer. The crux of the problem lies in the inability of operators identify where these poor experience customers are located, and the inability to identify the clusters of these users.

There is therefore a need for an advancement for identification of the customers with poor experience and identification of spatial clusters of these customers to pinpoint the exact location of the problem, allowing for more targeted network optimization.

The disclosure enables solution for direct pin-pointing of specific areas where customers with poor experience are concentrated, by identifying the customers who have a poor experience in the network, and then identifying clusters enclosed in a concave hull where these users are concentrated in a heterogeneous network.

OBJECTS OF THE PRESENT DISCLOSURE

One of the primary objects is that this invention helps organizations to pivot from network element driven performance optimization to user-driven performance improvement, enabling them to directly measure, track and improve user experience, in addition to clustering.

Another object of this invention is it provides solution for measuring and analyzing customer experience for each customer does not yield actionable results, unless it is aggregated and clustered so as to derive an area to address.

Another object of this invention is it provides solution by aggregating a multitude of metrics pertinent to the user's voice, data and coverage experience and deriving a single KPI, it is possible to benchmark and correspondingly track and improve their experience.

Another object of this invention is it provides solution to telecommunications service providers identify the hardest hit locations and deploy targeted solutions.

SUMMARY

In an aspect, the present disclosure provides for a system facilitating identification of poor experience in one or more wireless services by one or more users in a heterogenous network. The system may include one or more user equipment communicatively coupled to the heterogenous network, and the heterogenous network may further include a plurality of nodes and one or more network access points, the one or more access points configured to provide wireless services to the one or more users. The system may further include an analytics server operatively coupled to the heterogenous network. The analytics server may further include a processor that executes a set of executable instructions that are stored in a memory, upon execution of which, the processor causes the analytics server to: receive from the plurality of nodes a set of data packets pertaining to signal associated with the one or more wireless services to be accessed by the one or more user equipment received for a predefined period of time. The analytics server may extract, a first set of attributes from the set of data packets, the first set of attributes pertaining to parameters associated with signal quality, signal strength, interference, cell throughput, drop and mute occurrence of the one or more wireless services and then compare, the first set of attributes extracted with a predetermined set of parameters stored in a knowledgebase of a routing server, wherein the predetermined set of parameters comprise a threshold set of parameters for signal quality, signal strength, interference, cell throughput, drop and mute occurrence of the one or more wireless services. Based on the comparison of the first set of attributes extracted with the predetermined set of parameters, the analytics server may then categorize the set of data packets received into a predefined number of categories and calculate, a customer experience (CE) score based on the comparison of the first set of attributes extracted with the predetermined set of parameters. Furthermore, the analytics server may identify, one or more poor experience users based on the CE score calculated.

In an aspect, the present disclosure provides for a method facilitating identification of poor experience in one or more wireless services by one or more users in a heterogenous network. The method may include the steps of receiving, by an analytics server, from a plurality of nodes, a set of data packets pertaining to signal associated with one or more wireless services to be accessed by one or more user equipment associated with one or more users. The set of data packets may be received for a predefined period of time. The analytics server may be operatively coupled to a heterogenous network comprising the plurality of nodes and one or more network access points configured to provide wireless services to the one or more users. The method may further include the steps of extracting, by the analytics server, a first set of attributes from the set of data packets, the first set of attributes pertaining to parameters associated with signal quality, signal strength, interference, cell throughput, drop and mute occurrence of the one or more wireless services and the step of comparing, by the analytics server, the first set of attributes extracted with a predetermined set of parameters stored in a knowledgebase of a routing server. The predetermined set of parameters comprise a threshold set of parameters for signal quality, signal strength, interference, cell throughput, drop and mute occurrence of the one or more wireless services. Based on the comparison of the first set of attributes extracted with the predetermined set of parameters, the method may include the step of categorizing by the analytics server, the set of data packets received into a predefined number of categories and then calculating a customer experience (CE) score based on the comparison of the first set of attributes extracted with the predetermined set of parameters. Furthermore, the method may include the step of identifying, by the analytics server, one or more poor experience users based on the CE score calculated.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

DETAILED DESCRIPTION

Figure 1:
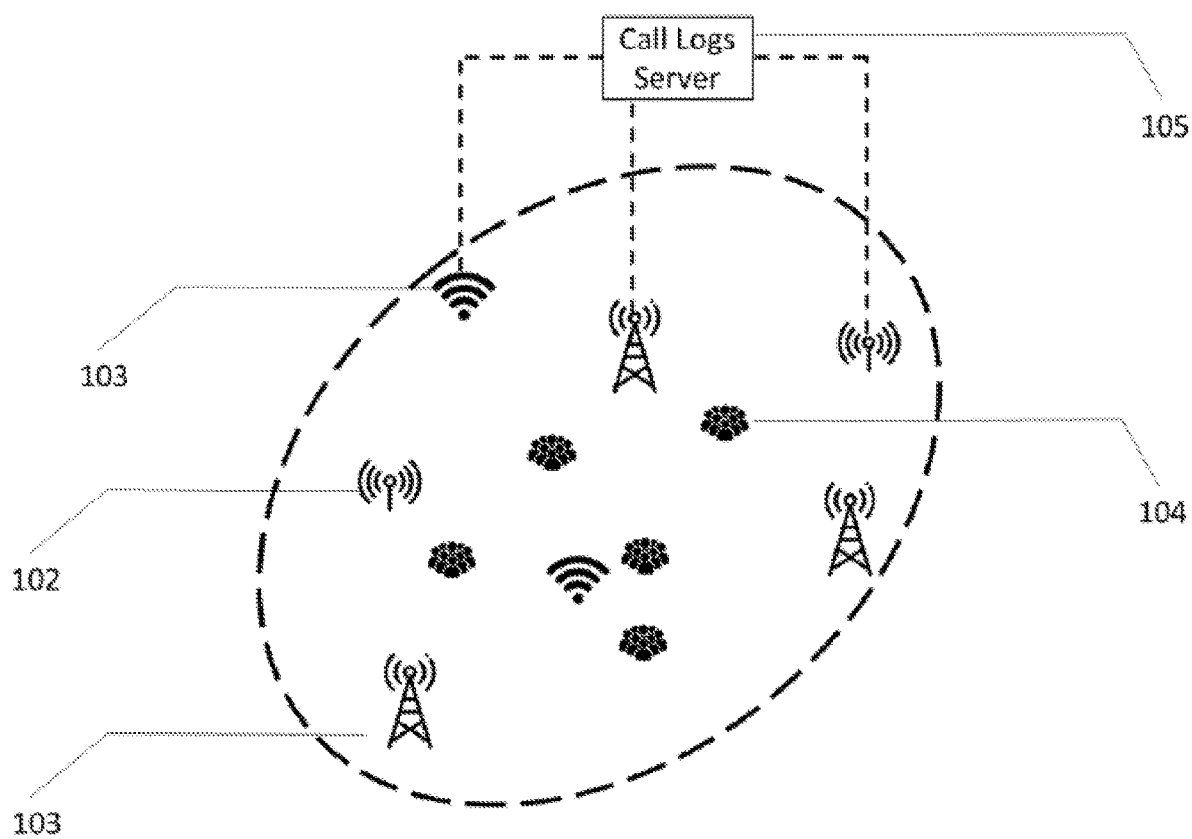
FIG. 1 illustrates existing Typical Heterogeneous Telecommunications Deployment in accordance with an embodiment of the present disclosure.

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only some of the problems discussed above. Some of the problems discussed above might not be fully addressed by any of the features described herein. Example embodiments of the present invention are described below, as illustrated in various drawings in which like reference numerals refer to the same parts throughout the different drawings.

In an aspect, the present disclosure relates for identification of the customers with poor experience and identification of spatial clusters of these customers to pinpoint the exact location of the problem, allowing for more targeted network optimization in a cost-effective method in a heterogeneous network. The disclosure enables solution for direct pinpointing of specific areas where customers with poor experience are concentrated, by identifying the customers who have a poor experience in the network, and then identifying clusters enclosed in a concave hull where these users are concentrated.

In an aspect, FIG. 1 depicts a typical heterogeneous network operating in an Area A. A telecommunications network is made up of radio network elements like Macro Cells [101], Small Cells [102] and Wi-Fi Access Points [103] to provide wireless services to the users. The network is accessed by users [104] who can be either humans or machines. In a typical IP based telecommunications network, users latch on the network via radio network elements and use IP based data or voice services as and when required. Each of the usage instance related to either voice or data is captured in a geolocated spatial measurement sample collected by a call logs server [105] located in the telecom core. Other modules can request the centralized entity 105 for the collection of measurement sample corresponding to particular time interval. A geolocated measurement sample may contain one or more of the following:

- IMSI (customer identifier)
- CELL ID (Macro Cell/Micro Cell/Wi-Fi Identifier)
- Latitude/Longitude (Estimated Location of the user)
- Voice/Data Flag
- Session Duration
- RSRP (Signal strength)
- RSRQ (Signal Quality)
- SINR (Signal to Interference and Noise ratio)
- Call Drop Flag (In case of Voice Flag being true)
- Call Mute Stat (In case of Voice Flag being true)

Figure 2:
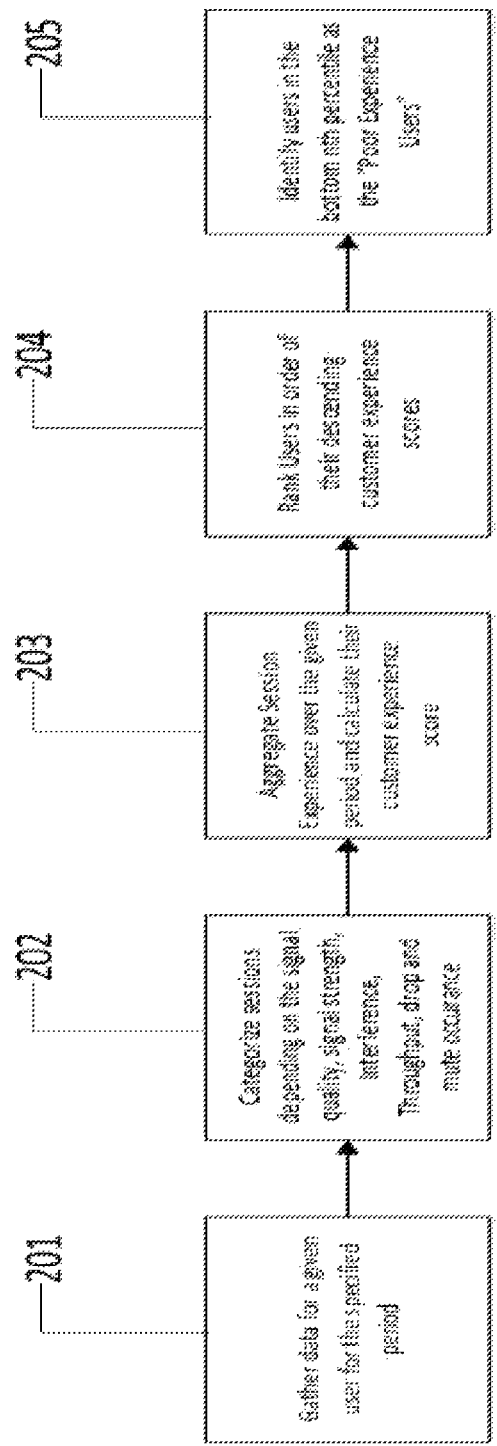
FIG. 2 illustrates an exemplary proposed Customer Experience Score Calculation and Identification of users with poor experience in accordance with an embodiment of the present disclosure.

In another embodiment, FIG. 2 explains the identification of poor experience users in accordance with various aspects of the invention. It starts with [201], where measurement samples are collected for a specified period of time. The samples are then categorized into buckets of signal quality, signal strength, interference, cell throughput, drop and mute occurrence as shown in [202]. After categorization, as shown in [204], samples are aggregated customer wise to derive aggregated values of buckets of signal quality, signal strength, interference, cell throughput, drop and mute occurrence per customer. Combining these buckets per customer wise, an overall customer experience value is calculated for each of the customer. Finally, as shown in [205], poor experience customers are identified based on customer experience score such that the score needs to be lower than nth percentile value of customer experience scores computed for each of the customers.

Figure 3:
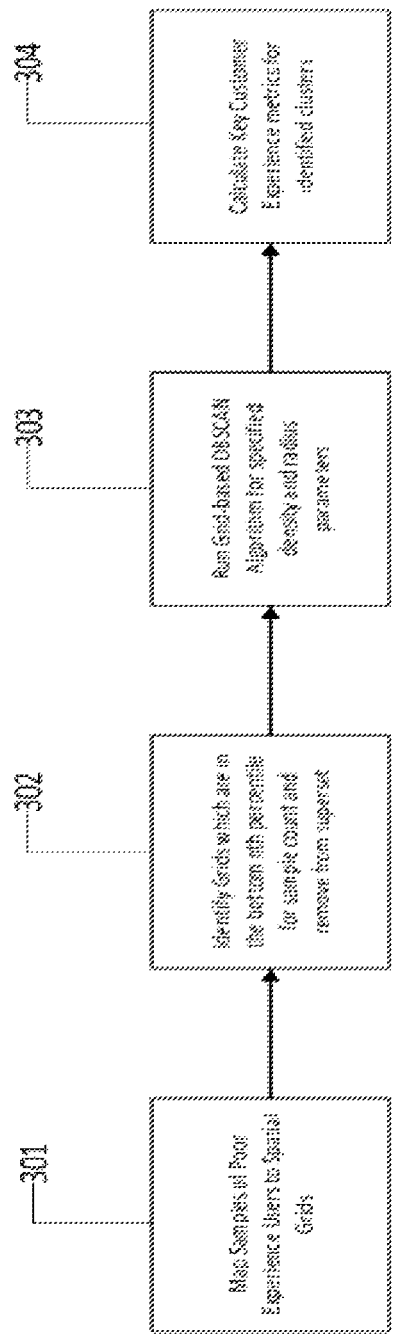
FIG. 3 illustrates an exemplary proposed Spatial clustering of identified grids of high-density block diagram in accordance with an embodiment of the present disclosure.

In another embodiment, FIG. 3 explains the process of clustering of spatial measurement samples belonging to poor experience customers that are identified to be part of the lower nth percentile of customer experience scores across all the customers computed as per FIG. 2. Process of clustering starts with [301], where samples, belonging to customers identified as having poor experience, are mapped to the spatial grids with each grid having a size S. After mapping all relevant samples to the corresponding spatial grids, as per [302], a set of grids are selected for clustering, the selection being based on the criteria that the selected grid sample counts should lie below the nth percentile of samples counts per grids across all the grids resulted from mapping the spatial measurement of poor experience customers. After selecting the grids for clustering, as per [303], a grid based DBSCAN algorithm is executed to build the grid clusters. Further, the DBSCAN algorithm is provided with two configurable parameters which are minimum cluster area and minimum measurement sample density respectively. Optionally, a concave boundary is also built around each cluster to represent the respective cluster as a spatial hole representative of poor customer experience area. Once the spatial clusters of poor experience customers are computed, [304] computes one or more parameters for each of the cluster by aggregating various fields/parameters of the spatial measured samples mapped to each of the grids belonging to the respective cluster.

Figure 4:
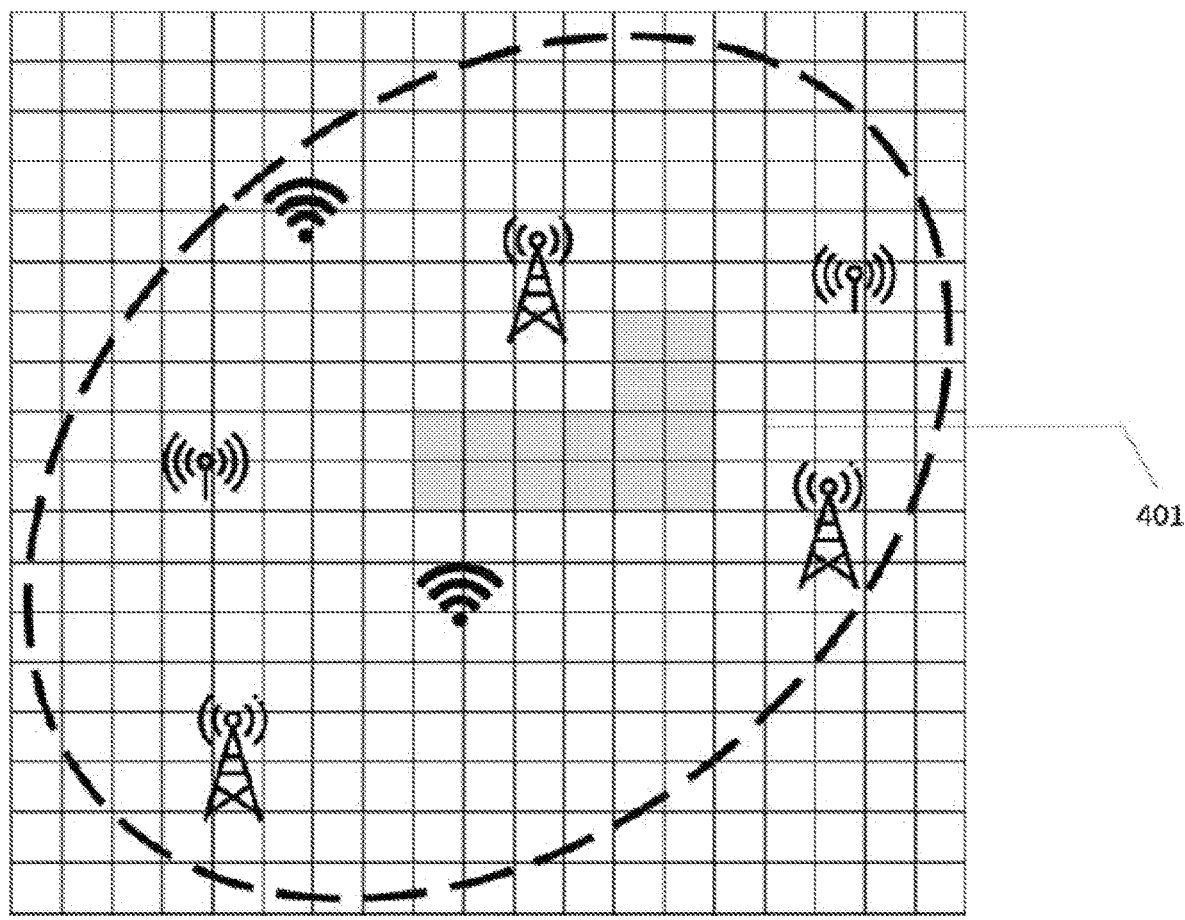
FIG. 4 illustrates an exemplary proposed Poor Experience Clusters in Area A of a heterogeneous network in accordance with an embodiment of the present disclosure.

In another embodiment, FIG. 4 shows a spatial cluster, [401], which is identified inside Area A after the execution of spatial clustering process as described in FIG. 3 on the spatial measurement samples of customers identified of having poor experience in accordance with various aspects of the invention.

Figure 5:
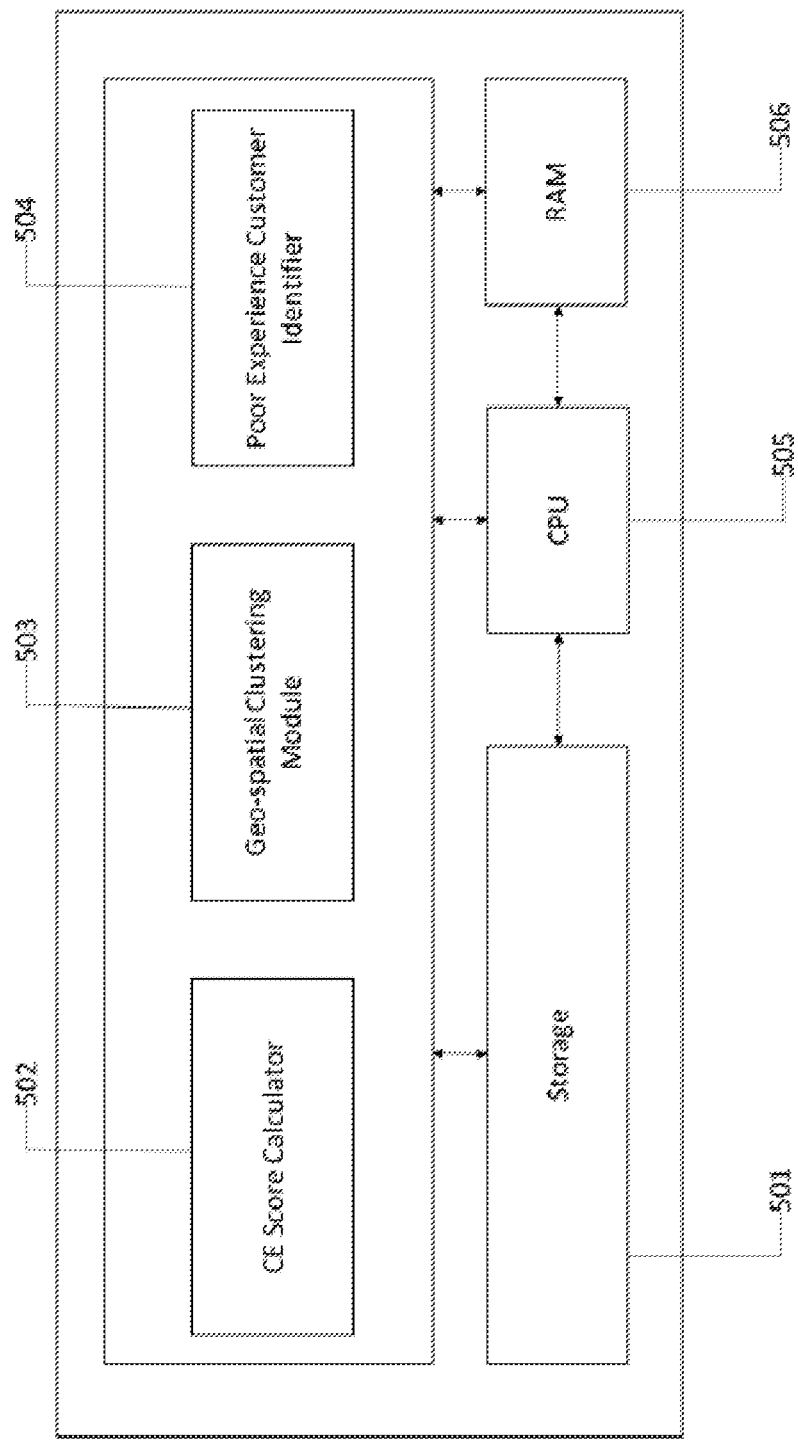
FIG. 5 illustrates an exemplary proposed System Diagram in accordance with an embodiment of the present disclosure.

In another embodiment, FIG. 5 describes the block diagram and the key components of the analytics server in accordance with various aspects of the invention. 501 shows a storage module where spatial measurement samples corresponding to Area A are fetched from the telecom core and stored for analysis. 502 represents the CEC (Customer experience calculator) Module which computes the customer experience score in accordance with various aspect of the invention and stored the computed customer experience score in the storage module 501 for later use. Module 504 identifies the poor experience customer in accordance with various aspects of the invention and stores the identified customers in the storage module 501 for later use. Module 503 represents geo-spatial clustering module, 503 picks the collection of spatial measurement samples and the list of poor experience customers stored in 501, filters the sample collection to select samples corresponding to poor experience customers only, and computes spatial clusters of poor experience customers and along with various parameters for each cluster in accordance with various aspects of invention. Computed clusters of poor experience customers are finally stored by 503 in the storage module 501 for visualization and reporting. 505 and 506 represents CPU and RAM respectively being accessed by 501, 502, 503 and 504 for their respective computing needs.

Figure 6:
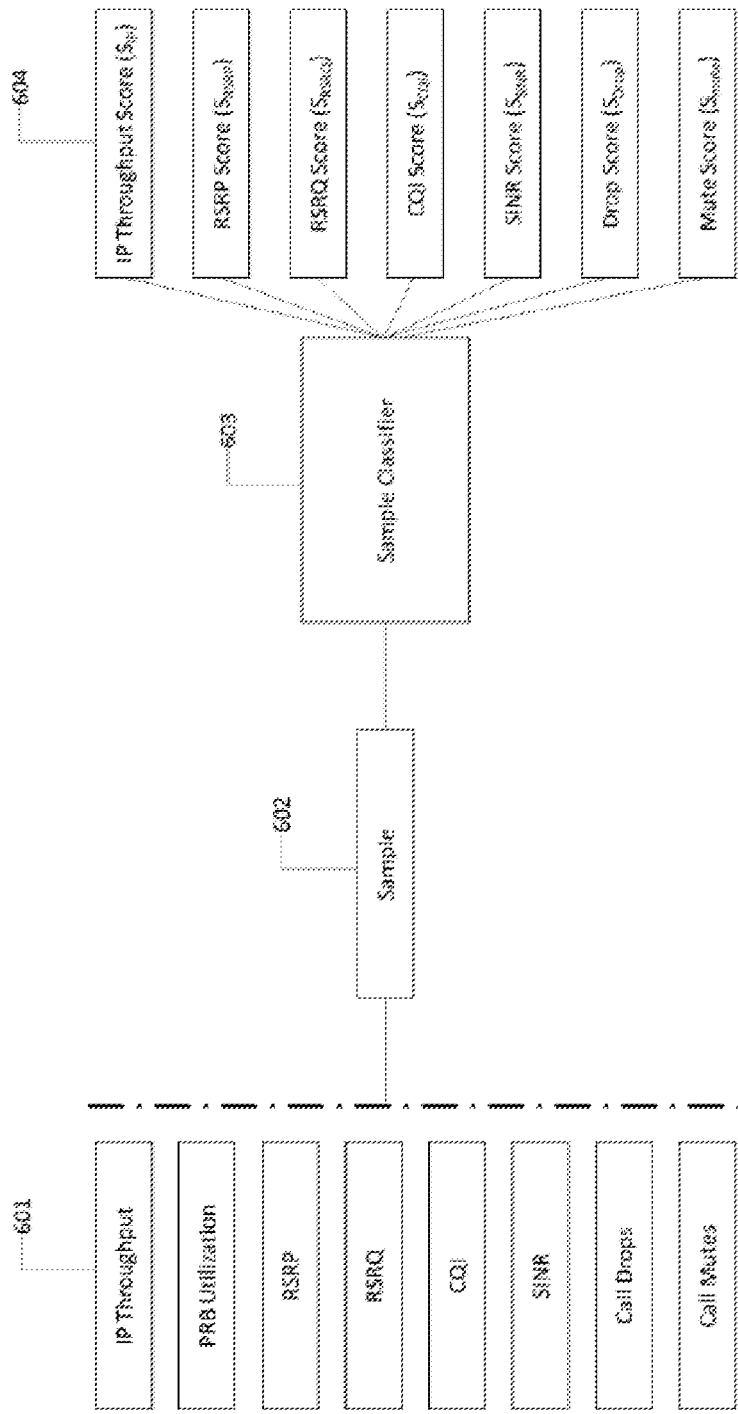
FIG. 6 illustrates an exemplary proposed Sample KPI Classification in accordance with an embodiment of the present disclosure.
Figure 7:
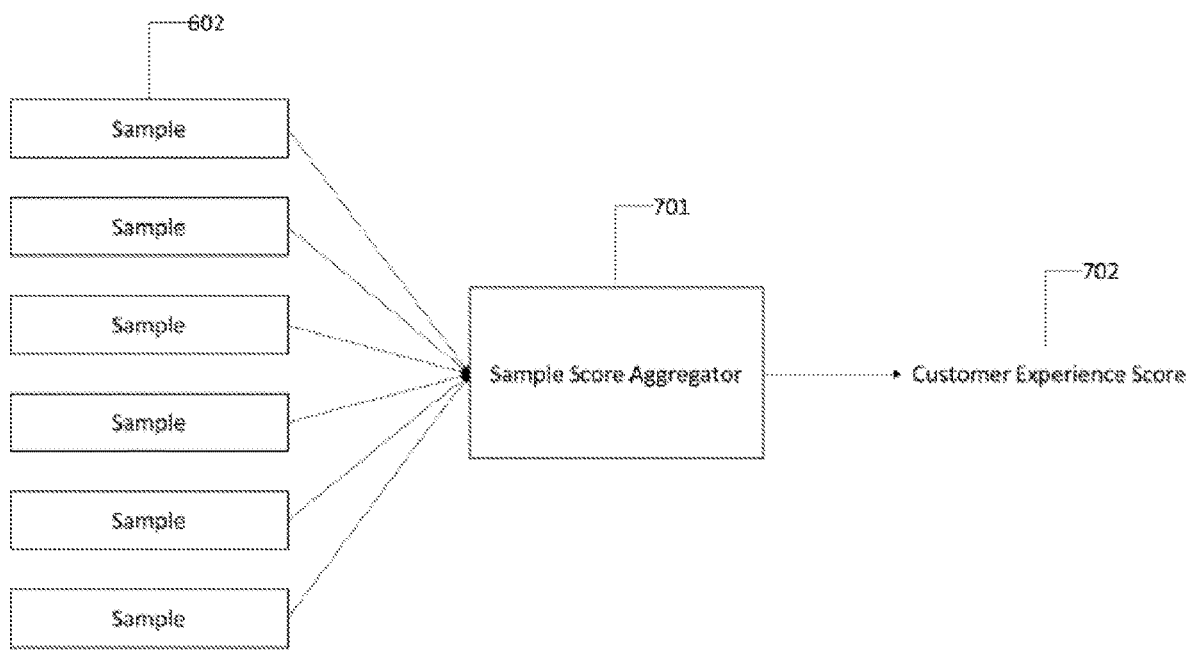
FIG. 7 illustrates an exemplary proposed Sample Score Aggregation in accordance with an embodiment of the present disclosure.

The CE Score calculation for a customer is illustrated in FIG. 6 and FIG. 7. It comprises the Sample Classifier and the Sample Score Aggregator [701]. CE Score calculation starts by classifying the Key Performance Indicators for each of the spatial measurement sample belonging to the customer into buckets, with 1 being the worst and 5 being the best. The bucket calculated for each KPI is called the Score for that KPI [604] for the spatial measurement sample [602]. This classification is done through the sample classifier [603], which parses each sample for the customer, and identifies the appropriate bucket the value should fall into.

In another embodiment, all samples [602], and their corresponding KPI scores [604] belonging to a customer are then fed to the Sample Score Aggregator to calculate the Customer Experience Score [702] for that customer for the certain time interval. The formula used by the Sample Score aggregator to calculate the customer experience score is as follows.

$$\text{Customer Experience Score} = \frac{\sum \tilde{S}_i * w_i}{n},$$

$$i \in \{RSRP, RSRQ, SINR, CQI, IP, \text{Drop}, \text{Mute}\}$$

$\tilde{S}$ here depicts the average score of a KPI aggregated over all samples of that customer for the given time interval. This score is calculated for each KPI and multiplied with the normalized weightage factor for that KPI $w_i$, such that $\Sigma w_i = 1$ The obtained sum is divided by n, where n is the number of non-zero $\tilde{S}$ obtained for that user for the specified duration.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

Advantages of the Present Disclosure

One of the primary advantages is that this invention helps organizations to pivot from network element driven performance optimization to user-driven performance improvement, enabling them to directly measure, track and improve user experience, in addition to clustering.

Another advantage of this invention is it provides solution for measuring and analyzing customer experience for each customer does not yield actionable results, unless it is aggregated and clustered so as to derive an area to address.

Another advantage of this invention is it provides solution by aggregating a multitude of metrics pertinent to the user's voice, data and coverage experience and deriving a single KPI, it is possible to benchmark and correspondingly track and improve their experience.

Another advantage of this invention is it provides solution to telecommunications service providers identify the hardest hit locations and deploy targeted solutions.

We claim:

1. A system facilitating identification of poor experience in one or more wireless services by one or more users in a heterogenous network, said system comprising:
    one or more user equipment communicatively coupled to the heterogenous network, said heterogenous network comprising:
        a plurality of nodes and one or more network access points, said one or more access points configured to provide wireless services to the one or more users;
        an analytics server operatively coupled to the heterogenous network, said analytics server comprising a processor that executes a set of executable instructions that are stored in a memory, upon execution of which, the processor causes the analytics server to:
            receive from said plurality of nodes a set of data packets, said set of data packets pertaining to signal associated with the one or more wireless services to be accessed by the one or more user equipment, wherein the set of data packets are received for a predefined period of time;
            extract, a first set of attributes from the set of data packets, the first set of attributes pertaining to parameters associated with signal quality, signal strength, interference, cell throughput, drop and mute occurrence of the one or more wireless services;
            compare, the first set of attributes extracted with a predetermined set of parameters stored in a knowledgebase of a routing server, wherein the predetermined set of parameters comprise a threshold set of parameters for signal quality, signal strength, interference, cell throughput, drop and mute occurrence of the one or more wireless services;
            based on the comparison of the first set of attributes extracted with the predetermined set of parameters, categorize the set of data packets received into a predefined number of categories;
            calculate, a customer experience (CE) score based on the comparison of the first set of attributes extracted with the predetermined set of parameters; and
            identify, one or more poor experience users based on the CE score calculated.

2. The system as claimed in claim 1, wherein the one or more poor experience users are identified based on a CE score that is lower than an nth percentile value of the customer experience scores computed for each of the users.

3. The system as claimed in claim 1, wherein the analytics server is further configured to:
    map one or more signal samples belonging to the one or more poor experience users to one or more spatial grids with each grid having a predefined size;
    compare the one or more signal samples of each grid with the nth percentile of signal samples counts per grids across the one or more spatial grids, and;
    upon comparison, select a set of grid clusters, if the one or more signal samples of the set of grids lie below the signal samples counts per grids across the one or more spatial grids.

4. The system as claimed in claim 3, wherein a set of instructions are executed to build a plurality of grid clusters from the selected set of grids based on minimum cluster area and minimum measurement sample density.

5. The system as claimed in claim 3, wherein a concave boundary is built around each grid cluster to represent the respective grid cluster as a spatial hole representative of poor user experience area.

6. The system as claimed in claim 3, wherein the set of grid clusters are stored in a storage module for visualization and reporting.

7. The system as claimed in claim 1, wherein the one or more poor experience users are stored in the storage module for visualization and reporting.

8. The system as claimed in claim 1, wherein the analytics server is further configured to directly measure, track and improve user experience, in addition to clustering.

9. The system as claimed in claim 1, wherein the signal samples comprise an aggregation of a metrics pertinent to the user's voice, data and coverage experience.

10. The system as claimed in claim 1, wherein the analytics server is configured to continuously monitor and track user experience, wherein the analytics server further identifies any hardest hit locations and deploys targeted solutions.

11. A method facilitating identification of poor experience in one or more wireless services by one or more users in a heterogenous network, said method comprising:
    receiving, by an analytics server, from said plurality of nodes a set of data packets, said set of data packets pertaining to signal associated with one or more wireless services to be accessed by one or more user equipment associated with one or more users, wherein the set of data packets are received for a predefined period of time, and wherein the analytics server is operatively coupled to a heterogenous network, said heterogenous network comprising a plurality of nodes and one or more network access points, said one or more access points configured to provide wireless services to the one or more users;
    extracting, by the analytics server, a first set of attributes from the set of data packets, the first set of attributes pertaining to parameters associated with signal quality, signal strength, interference, cell throughput, drop and mute occurrence of the one or more wireless services;
    comparing, by the analytics server, the first set of attributes extracted with a predetermined set of parameters stored in a knowledgebase of a routing server, wherein the predetermined set of parameters comprise a threshold set of parameters for signal quality, signal strength, interference, cell throughput, drop and mute occurrence of the one or more wireless services;
    based on the comparison of the first set of attributes extracted with the predetermined set of parameters, categorizing by the analytics server, the set of data packets received into a predefined number of categories;

calculating, by the analytics server, a customer experience (CE) score based on the comparison of the first set of attributes extracted with the predetermined set of parameters; and identifying, by the analytics server, one or more poor experience users based on the CE score calculated.

12. The method as claimed in claim 11, wherein the method further comprises:

Identifying, by the analytics server, the one or more poor experience users based on a CE score that is lower than an nth percentile value of the customer experience scores computed for each of the users.

13. The method as claimed in claim 11, wherein the method further comprises:

Mapping, by the analytics server, one or more signal samples belonging to the one or more poor experience users to one or more spatial grids with each grid having a predefined size;

Comparing, by the analytics server, the one or more signal samples of each grid with the nth percentile of signal samples counts per grids across the one or more spatial grids, and;

upon comparison, selecting, by the analytics server, a set of grid clusters, if the one or more signal samples of the set of grids lie below the signal samples counts per grids across the one or more spatial grids.

14. The method as claimed in claim 13, wherein the method further comprises:

executing a set of instructions to build a plurality of grid clusters from the selected set of grids based on minimum cluster area and minimum measurement sample density.

15. The method as claimed in claim 13, wherein the method further comprises:

building a concave boundary around each grid cluster to represent the respective grid cluster as a spatial hole representative of poor user experience area.

16. The method as claimed in claim 13, wherein the method further comprises:

storing the set of grid clusters in a storage module for visualization and reporting.

17. The method as claimed in claim 11, wherein the method further comprises:

storing the one or more poor experience users are stored in the storage module for visualization and reporting.

18. The method as claimed in claim 11, wherein the method further comprises:

configuring the analytics server is further configured to directly measure, track and improve user experience, in addition to clustering.

19. The method as claimed in claim 11, wherein the signal samples comprises an aggregation of a metrics pertinent to the user's voice, data and coverage experience.

20. The method as claimed in claim 13, wherein the method further comprises:

configuring the analytics server to continuously monitor and track user experience, wherein the analytics server further identifies any hardest hit locations and deploys targeted solutions.

* * * * *